United States Patent
Tan et al.

(10) Patent No.: US 9,883,351 B2
(45) Date of Patent: Jan. 30, 2018

(54) INDOOR POSITIONING DEVICE AND INDOOR POSITIONING METHOD

(71) Applicant: SHENZHEN INSTITUTES OF ADVANCED TECHNOLOGY CHINESE ACADEMY OF SCIENCES, Shenzhen (CN)

(72) Inventors: Guang Tan, Shenzhen (CN); Bo Xie, Shenzhen (CN); Chenghua Mao, Shenzhen (CN); Zhongkai Xiao, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 0 days.

(21) Appl. No.: 15/309,128

(22) PCT Filed: Oct. 15, 2015

(86) PCT No.: PCT/CN2015/092011
§ 371 (c)(1),
(2) Date: Nov. 4, 2016

(87) PCT Pub. No.: WO2016/150146
PCT Pub. Date: Sep. 29, 2016

(65) Prior Publication Data
US 2017/0078852 A1    Mar. 16, 2017

(30) Foreign Application Priority Data

Mar. 25, 2015 (CN) .......................... 2015 1 0134488
May 20, 2015 (CN) .......................... 2015 1 0259750

(51) Int. Cl.
*H04B 10/00* (2013.01)
*H04W 4/04* (2009.01)
(Continued)

(52) U.S. Cl.
CPC ................. *H04W 4/04* (2013.01); *G01S 1/70* (2013.01); *H04B 10/114* (2013.01); *H04W 64/00* (2013.01)

(58) Field of Classification Search
CPC . H04B 10/116; H04B 10/114; H04B 10/1149; H04B 10/5563; H04B 10/40;
(Continued)

(56) References Cited

U.S. PATENT DOCUMENTS

| 5,142,399 | A | * | 8/1992 | Bertrand | H04B 10/1143 398/118 |
| 5,909,296 | A | * | 6/1999 | Tsacoyeanes | H04B 10/11 398/129 |
| 6,417,946 | B1 | * | 7/2002 | Krieger | H01L 31/0203 257/100 |
| 6,829,439 | B1 | * | 12/2004 | Sidorovich | H04B 10/2503 398/131 |

(Continued)

FOREIGN PATENT DOCUMENTS

| CN | 102158956 | 8/2011 |
| CN | 102802260 | 11/2012 |

(Continued)

OTHER PUBLICATIONS

International Search Report and Written Opinion of International application No. PCT/CN2015/092011, with English and Chinese, dated Jan. 18, 2016, total 9 pages.

*Primary Examiner* — Hibret Woldekidan
(74) *Attorney, Agent, or Firm* — Hamre, Schumann, Mueller & Larson, P.C.

(57) ABSTRACT

Disclosed is an indoor positioning device which comprises a base, a light source mounted on the base, a rotating part, a rotating outer shell and a controller; the rotating outer shell is a hemispherical shell body or a shell body being tangent externally with a hemispherical surface; a luminous point is located at a spherical center of the rotating outer shell; the rotating outer shell is divided into a plurality of encoded rings, each encoded ring is divided into a plurality of encoding bits, a angle β of each encoding bit in a latitudinal (Continued)

direction is 360/N degrees, different encoded rings has different arrangements of encoding bits; in each encoded ring, some encoding bits are in a transparent state, there is no arrangement of two continuous opaque encoding bits, some encoding bits arranged in a specified style constitute a start bit or an end bit; once a light barrier of the rotating part passes through an optical coupler, the light source generates a frequency hopping; a receiver senses an optical signal and performs positioning. According to the special rotating outer shell and the frequency hopping light source, and in combination with the receiver, the optical signal can be sensed and positioning can be implemented. The indoor positioning device has a simplified structure and the method for indoor positioning is novel, accurate, has a good stability and a low cost, and is applicable to indoor positioning with high precision.

15 Claims, 11 Drawing Sheets

(51) Int. Cl.
  *G01S 1/70* (2006.01)
  *H04B 10/114* (2013.01)
  *H04W 64/00* (2009.01)

(58) Field of Classification Search
  CPC ........... H04W 4/04; H04W 64/00; G01S 1/70; Y10T 29/4927; G01C 21/206
  USPC .................................. 398/118, 127–132, 172
  See application file for complete search history.

(56) References Cited

U.S. PATENT DOCUMENTS

| | | | | |
|---|---|---|---|---|
| 7,142,348 | B2* | 11/2006 | Sayyah | G01S 17/74 250/214 R |
| 7,336,407 | B1* | 2/2008 | Adams | G01S 7/495 359/211.1 |
| 7,583,901 | B2* | 9/2009 | Nakagawa | G09F 9/33 398/183 |
| 7,657,183 | B2* | 2/2010 | Drago | H04B 10/118 398/122 |
| 7,953,326 | B2* | 5/2011 | Farr | H04B 13/02 398/104 |
| 8,233,803 | B2* | 7/2012 | Meyer | G08C 17/02 398/106 |
| 9,337,927 | B2* | 5/2016 | Yeh | H04B 10/116 |
| 9,360,310 | B2* | 6/2016 | Tan | G01V 8/20 |
| 2009/0310976 | A1* | 12/2009 | Nakagawa | G09F 9/33 398/183 |
| 2014/0347648 | A1* | 11/2014 | Roberts | G01S 17/06 356/4.01 |
| 2015/0188630 | A1* | 7/2015 | Yeh | H04B 10/116 398/130 |
| 2015/0196674 | A1* | 7/2015 | Newham | A61L 2/10 250/455.11 |
| 2017/0276767 | A1* | 9/2017 | Ho | H04B 10/116 |

FOREIGN PATENT DOCUMENTS

| | | |
|---|---|---|
| CN | 104243029 | 12/2014 |
| CN | 104735780 | 6/2015 |
| CN | 104914407 | 9/2015 |
| WO | 2012087944 | 6/2012 |

* cited by examiner

When each encoding circle has an identical angle in the longitudinal direction, determining the angle between a connecting line that connects an inner edge of the projection light ring where the point to be positioned is located with the light source and the rotating axis of the rotating outer shell; when each encoding circle has a different angle in the longitudinal direction, determining an angle between a connecting line that connects the inner edge of the projection light ring where the point to be positioned is located with the light source and the rotating axis of the rotating outer shell; wherein, r is the number of the projection light rings at the inner side of the projection ring where the point to be positioned is located, $\alpha_1, \alpha_2, \cdots \alpha_m$ are angles of a first encoding circle, a second encoding circle, ...... a mth encoding circle in the longitudinal direction respectively

— S201

According to the width of the special encoding bit sensed by the receiving end, determining an included angle $\Delta\theta^r$ of the point to be positioned and the inner edge of the projection light ring where the point to be positioned is located relative to the light source

— S202

Determining the angle $\omega = \omega^r + \Delta\omega^r$ between the connecting line that connects the point to be positioned with the light source and the rotating axis

INDOOR POSITIONING DEVICE AND INDOOR POSITIONING METHOD

TECHNICAL FIELD

The present application relates to the technical field of positioning, and more particularly, relates to an indoor positioning device and an indoor positioning method.

BACKGROUND

With the progress of technology and the development of social economy, people's demand for indoor positioning services is increasing continuously; in some public places, such as markets, airports, exhibition halls, office buildings, warehouses, underground parking garages, and so on, accurate indoor positioning information can help a user shop, travel, find out an indoor target, and do the like; can achieve highly efficient management of available space and material stock, and can direct policemen, firemen, soldiers, or health care workers, and the like to accomplish specific indoor tasks. Intelligent space, pervasive computing and the like cannot work without location services, therefore, indoor positioning has a broad application prospect. Although GPS (Global Positioning System) can meet the requirements of many applications in the aspect of outdoor positioning, due to the obstructions by walls and indoor objects, in an indoor environment, GPS signals may be very weak or even disappear, therefore, it is difficult to use GPS to perform positioning indoors.

Domestic and abroad researches in indoor positioning technologies are quite abundant. According to positioning principles, a proximity detection method, a fingerprint matching method, a multilateration/angulation method, and so on, can be provided. The proximity detection method uses the place of a detected signal source as the locating position, and has a low accuracy. The fingerprint matching method uses signal characteristics in the indoor environment to match position and can obtain a better positioning accuracy, however, the result may be easily affected by the multipath effect, environment changes, and so on, and thus the positioning result may not be stable, with limited accuracy; moreover, a fingerprint database may need to be established, and cumbersome work is required. The multilateration/angulation method needs to use an algorithm, such as TOA (Time of Arrival), TDOA (Time Difference of Arrival), and AOA (Angle of Arrival), to accurately measure information such as distance/angle from a positioning point to a reference point firstly, and then use a positioning method, such as a trilateration method, to position a target. If the location information of the reference point is accurate, and the measured distance is accurate too, a location of a target node can be calculated accurately; however, in reality, these measurements may contain errors, which affect the positioning results. If full indoor signal coverage is required, many reference points need to be provided, thereby making the cost very high.

A patent application with an application number of CN201110054768.3 discloses a weighted trilateration positioning method based on RSSI (Received Signal Strength Indicator), of which the limitation is that this method cannot accurately measure the distance between nodes, and thus the position error is large.

A patent application with an application number of CN201210290193.X discloses a WLAN (Wireless Local Area Network) indoor positioning method based on matrix relations, of which the limitation is that collecting indoor environment characteristic fingerprints needs much manpower and material resources, and due to the complexity of the indoor environment which causes serious multipath effect, wireless signals are adversely affected, so that the positioning accuracy is low.

Technical Problem

A purpose of the present invention is to provide an indoor positioning device, which aims at simplifying a structure of a positioning device, and the indoor positioning device has a high positioning accuracy, good stability and low cost.

Technical Solution

The present invention is implemented in this way: an indoor positioning device, comprising a base, a light source mounted on the base, a rotating part, a rotating outer shell arranged on the rotating part, and a controller;

the rotating outer shell is a hemispherical shell body or a shell body formed by splicing a plurality of small flat surfaces or annular surfaces together and being tangent externally with a hemispherical surface; a luminous point of the light source is positioned at a spherical center of the hemispherical surface; the rotating outer shell is divided into a plurality of encoded rings that are parallel to latitude lines, in a longitudinal direction, an angle α of each encoded ring relative to the light source is known; each encoded ring relative to the light source is divided into a plurality of encoding bits, in a latitudinal direction, a angle β of each of the encoding bits with respect to a center point of the encoded ring is 360/N degree, wherein N is the number of the encoding bits in one encoded ring, and different encoded rings have different arrangements of encoding bits;

in each encoded ring, some encoding bits are in a transparent state, and there is no arrangement of two or more continuous opaque encoding bits, some encoding bits arranged in a specified style constitute a start bit or an end bit of the encoded ring;

the base is further provided with an opto-isolator having a groove, a side of the rotating part facing the base is provided with a light barrier, once the rotating part drives the light barrier to pass through the groove, the controller controls the light source to generate a frequency hopping;

the indoor positioning device further comprises a receiver configured to be placed at a point to be positioned to sense optical signal, detecting a frequency hopping point, and performing positioning according to the optical signal and the frequency hopping point.

Another purpose of the present invention to provide an indoor positioning method based on the indoor positioning device, which comprises the following steps:

driving a rotating outer shell to rotate, and enabling a projected light ring of the rotating outer shell projected by a light source onto a horizontal plane where a point to be positioned is located to rotate with the rotating outer shell;

sensing an optical signal by a receiver located at the point to be positioned, determining the projected light ring where the receiver is located according to the optical signal, and determining an angle θ between a connecting line that connects the point to be positioned with the light source and a rotating axis of the rotating outer shell;

defining a direction directed by a projection of a distal end of a start bit or an end bit on a horizontal plane when a light barrier passes through a groove as an initial direction, detecting a frequency hopping point of the light source and the distal end of the start bit or the end bit, and determining an angle ω between the point to be positioned and the initial direction by the receiver;

determining the position of the point to be positioned according to the angle and the angle ω.

BENEFICIAL EFFECTS

In the indoor positioning device provided by the embodiment of the present invention, by arranging the rotating outer shell having a special structure and designing the hopping rule of a frequency of the light source, a signal receiver is used to sense the optical signal; according to the arrangement of the encoded rings and the encoding bits of the rotating outer shell and in combination with the collected optical signal, the coordinate of the signal receiver in indoor space can be calculated by the aforesaid method; the indoor positioning device has a simplified structure, and the indoor positioning method is novel, accurate, and has a good stability; there is no need to spend much manpower and material resources in collecting data such as fingerprints, and there is no need to arrange many reference points; the indoor positioning device is not prone to be affected by an external environment, has a high precision, a good stability, and low cost, and is applicable to indoor positioning with high precision.

BRIEF DESCRIPTION OF THE DRAWINGS

FIG. 13 illustrates a flow chart of obtaining an angle θ by an indoor positioning method provided by the second embodiment of the present invention;

DETAILED DESCRIPTION OF THE PREFERRED EMBODIMENT

Figure 1:
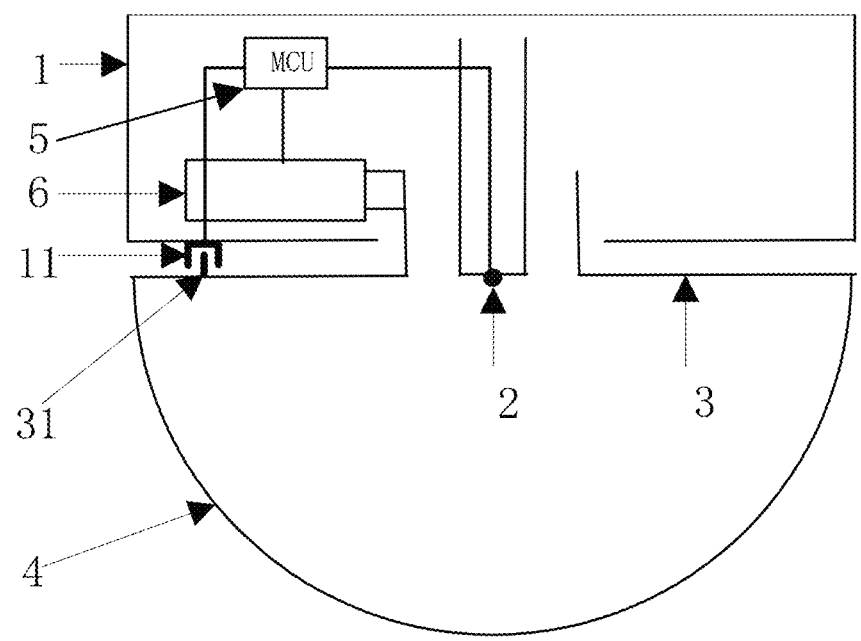
FIG. 1 illustrates a structural diagram of an indoor positioning device provided by a first embodiment of the present invention.
Figure 2:
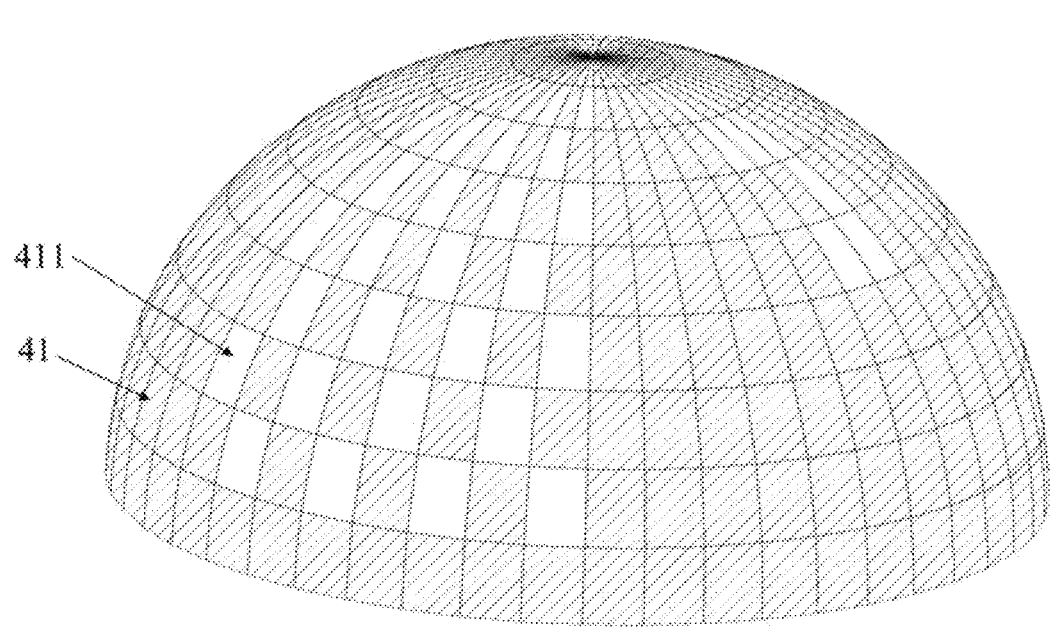
FIG. 2 illustrates a spatial structural schematic diagram of a rotating outer shell of the indoor positioning device provided by the first embodiment of the present invention.
Figure 3:
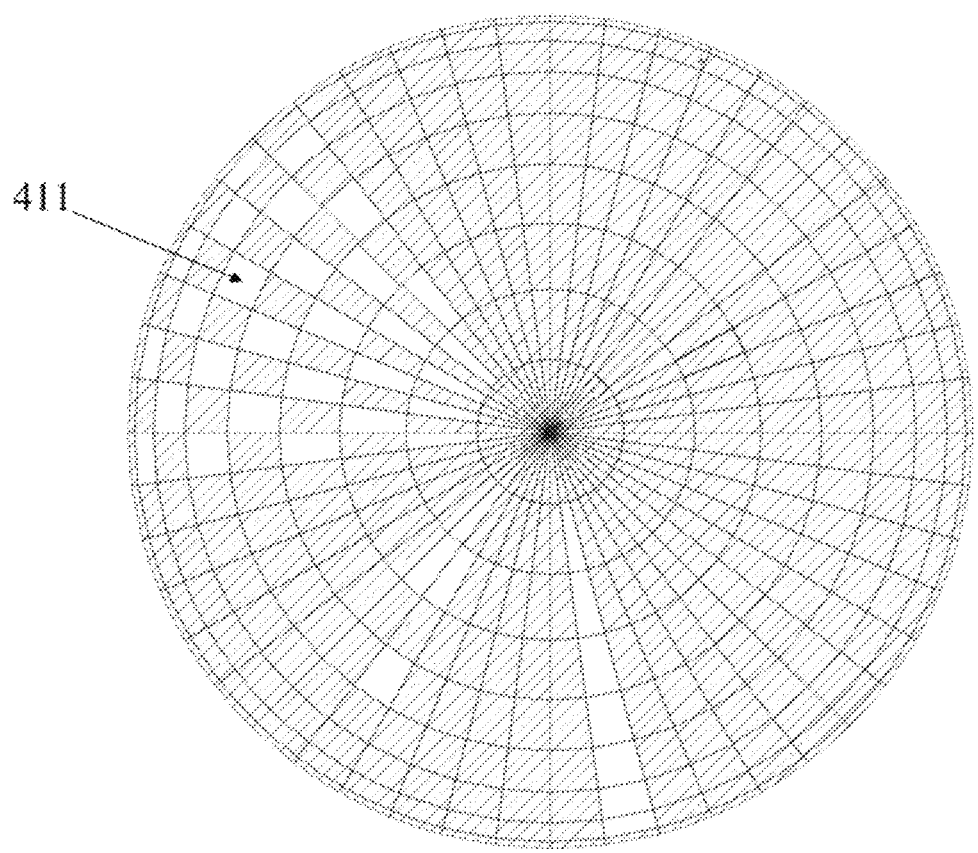
FIG. 3 illustrates a top structural schematic diagram of the rotating outer shell of the indoor positioning device provided by the first embodiment of the present invention.

In order to make the purpose, technical solutions and advantages of the present invention be clearer and more understandable, the present invention will be described in detail with reference to accompanying drawings and embodiments. It should be understood that the specific embodiments described herein are only used to explain the present invention, rather than limiting the present invention.

A specific implementation of the present invention will be described in detail in combination with embodiments below:

Embodiment One

Please refer to FIGS. 1-4, a first embodiment of the present invention provides an indoor positioning device, which comprises a base 1, a light source 2 mounted on the base 1, a rotating part 3, and a rotating outer shell 4 arranged on the rotating part 3, and further comprises a controller 5 that can control the light source 2 to generate a frequency hopping. Wherein, the rotating part 3 can be driven to rotate by a driving motor 6, the driving motor 6 can also be placed in the base 1. The rotating part 3 can specifically comprises an annulus, the rotating outer shell 4 is fixed on the annulus and can rotate with the annulus synchronously. The rotating outer shell 4 is a hemispherical shell body or a shell body spliced by a plurality of small flat surfaces or annular surfaces and being tangent outwardly with a hemispherical surface; in short, the rotating outer shell 4 is hemispherical or has a hemispherical basal plane, a cross section of the rotating outer shell 4 (a cross section perpendicular to a rotating axis) is ring-shaped or regular polygon shaped, a luminous point of the light source 2 is located at a centre of sphere of the semi-spherical surface. The rotating outer shell 4 is divided into a plurality of encoded rings 41 parallel to latitude lines and in a longitudinal direction, a angle α of each of the encoded rings 41 relative to the light source 2 is known (the angle α is a flare angle between an inner edge and an outer edge of an encoded ring relative to the light source and in the same longitudinal direction), angles of the encoded rings 41 can be identical or not exactly identical. Moreover, each of the encoded rings 41 can be divided into a plurality of encoding bits 411, these encoding bits 411 are orderly arranged in a latitudinal direction, and in the latitudinal direction, an angle β of each of the encoding bits 411 relative to a center point of the encoded ring 41 is the same value (the angle β is a flare angle between a front edge and a back edge of an encoding bit relative to the aforesaid center point), that is, 360/N degrees, wherein N is the number of the encoding bits 411 in one encoded ring 41. In order to distinguish different encoded rings 41 when positioning, arrangement styles of encoding bits 411 of different encoded rings 41 need to be different, that is, each encoded ring 41 needs to have particularity and uniqueness. Further, in each of the encoded rings 41, a plurality of encoding bits 411 are in a transparent status, the rest of the encoding bits 411 are in an opaque status, and there is no arrangement of two or more continuous opaque encoding bits 411; a plurality of encoding bits 411 arranged in a specific arrangement constitute a start bit or an end bit of the encoded ring 41, since the rotating outer shell 4 rotates circumferentially, the start bit is identical to the end bit. For simple expression, both the start bit and the end bit are referred to as "the end bit" hereinafter.

Figure 5:
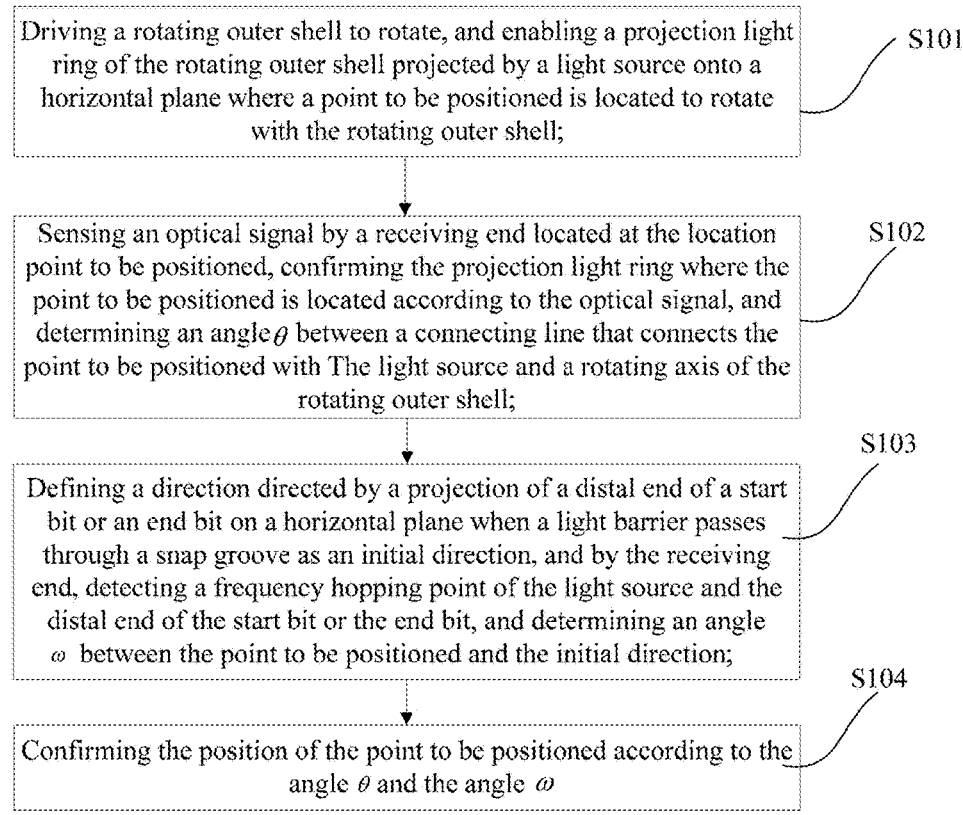
FIG. 5 illustrates a flow chart of an indoor positioning method provided by the first embodiment of the present invention.

In this embodiment of the present invention, a plurality of continuous transparent encoding bits (two, three, four, five, or more) can be arranged in each of the encoded rings 41 and used as the end bit S, as shown in FIG. 5, and the encoding bits 411 contained in the end bits of different encoded rings 41 have the same number and are located at the same place, that is, these encoding bits 411 are aligned upwardly and downwardly in the longitudinal direction. In this embodiment of the present invention, a transparent encoding bit 411 is recorded as "1", and an opaque encoding bit 411 is recorded as "0". Each of the encoded rings 41 can be represented as a sequence composed of "1" and "0" arranged according to a certain rule. For example, when the aforesaid end bit includes five continuous transparent encoding bits, it can be recorded as "11111". Of course, the more precise the division of the encoded rings 41 and the encoding bits 411, the higher the positioning accuracy.

The base 1 is provided with an optical coupler 11 having a groove, a side of the rotating part 3 facing the base 1 is provided with a light barrier 31, once the rotating part 3 rotates and drives the light barrier 31 to pass through the groove for one time, the controller 5 controls the light source 2 to generate a frequency hopping for one time; a receiver 7 located at the point to be positioned can sense the frequency hopping, and a system performs positioning according to optical signal sensed by the receiver 7, the frequency hopping point, and the end bit information.

Figure 4:
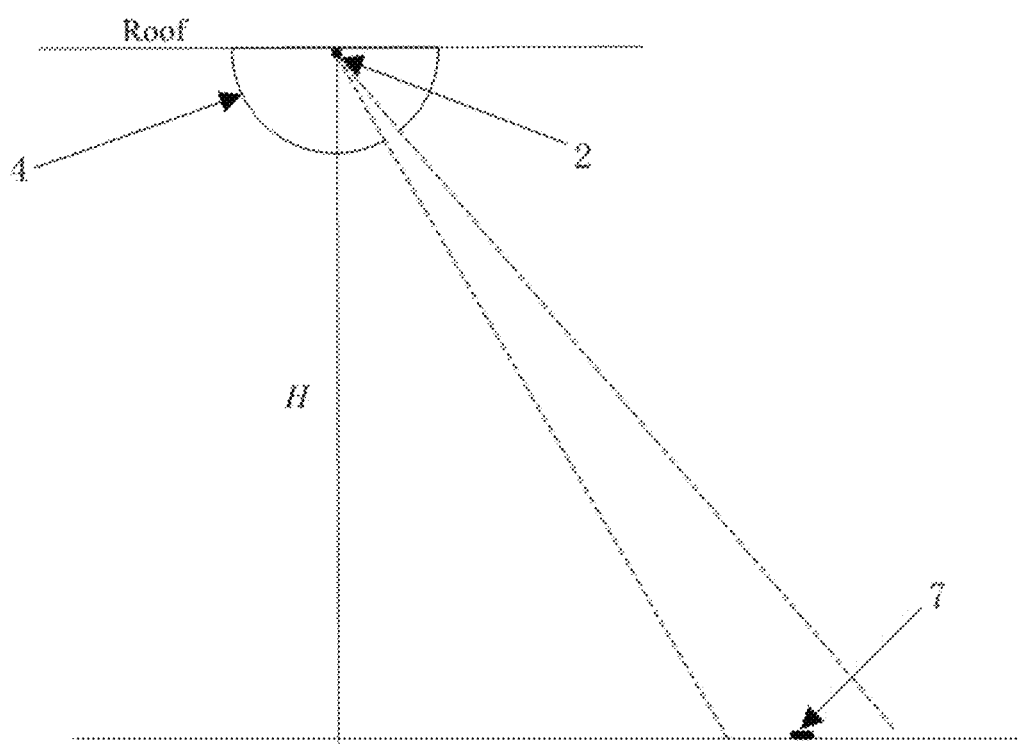
FIG. 4 illustrates a schematic diagram of a working status of the indoor positioning device provided by the first embodiment of the present invention.

A specific positioning principle is as follows: please further refer to FIGS. 4-6, the rotating outer shell 4 of the indoor positioning device can be projected into the space by the light source 2, and a projected light ring 8 is thereby formed in any horizontal plane where the point to be positioned is located; when the rotating outer shell 4 rotates, the projected light ring 8 rotates at the same time; when the projected light ring 8 where the receiver 7 is located is rotated, the receiver 7 can detect a change of light intensity, and this signal corresponds to a corresponding encoded ring 41; in this way, the projected light ring 8 where the receiver 7 is located can be determined, according to angles of the encoded rings 41 in the longitudinal direction, an included angle $\theta$ between a connecting line that connects the point to be positioned with the light source 2 and a rotating axis of the rotating outer shell 4 can be determined. However, it is unable to position according to the included angle $\theta$ yet. An angle $\omega$ of the point to be positioned relative to an initial direction, that is, an angle between a connecting line that connects the point to be positioned and a center point of the projected light ring 8 where the point to be positioned is located and the initial direction needs to be determined too. When the light barrier 31 passes through the optical coupler 11, a direction directed by a projection of a distal end of the end bit on a horizontal plane where the point to be positioned is located is defined as the initial direction D; after the angle $\omega$ of the receiver 7 relative to the initial direction is determined, and further in combination with a known coordinate of the light source 2, a coordinate of the point to be positioned can be confirmed.

Further, the light source 2 is set to work under a first frequency and a second frequency; in a measurement process, when the light barrier 31 just passes through the middle of the groove of the optical coupler 11, the state of the optical coupler 11 will change, and an external interrupt is triggered; when the controller 5 detects this interrupt signal, a flicker frequency of the light source 2 is reset according to following rules:

if the current flicker frequency of the light source 2 is the first frequency, the flicker frequency of the light source 2 is set to be the second frequency;

if the current flicker frequency of the light source 2 is the second frequency, the rotating outer shell 4 is continuously rotated by an angle of one encoding bit 411, and then the flicker frequency of the light source 2 is set to be the first frequency.

The reason for this design is that the rotating outer shell 4 has opaque encoding bits, if a frequency hopping takes place when the receiver 7 is located in a projection of a opaque encoding bit, the receiver 7 can't sense the optical signal; however, by setting the aforesaid two types of hopping modes, in combination with the characteristic that there is no arrangement of two or more continuous opaque encoding bits, it is ensured that the receiver 7 must be able to detect the frequency hopping. It can be further concluded that, since the aforesaid hopping rule is preset, by the identification of the first frequency and the second frequency, whether the hopping point is located at an initial position or at an encoding bit after the initial position can also be judged, and thus the angle $\omega$ can be accurately calculated.

Figure 6:
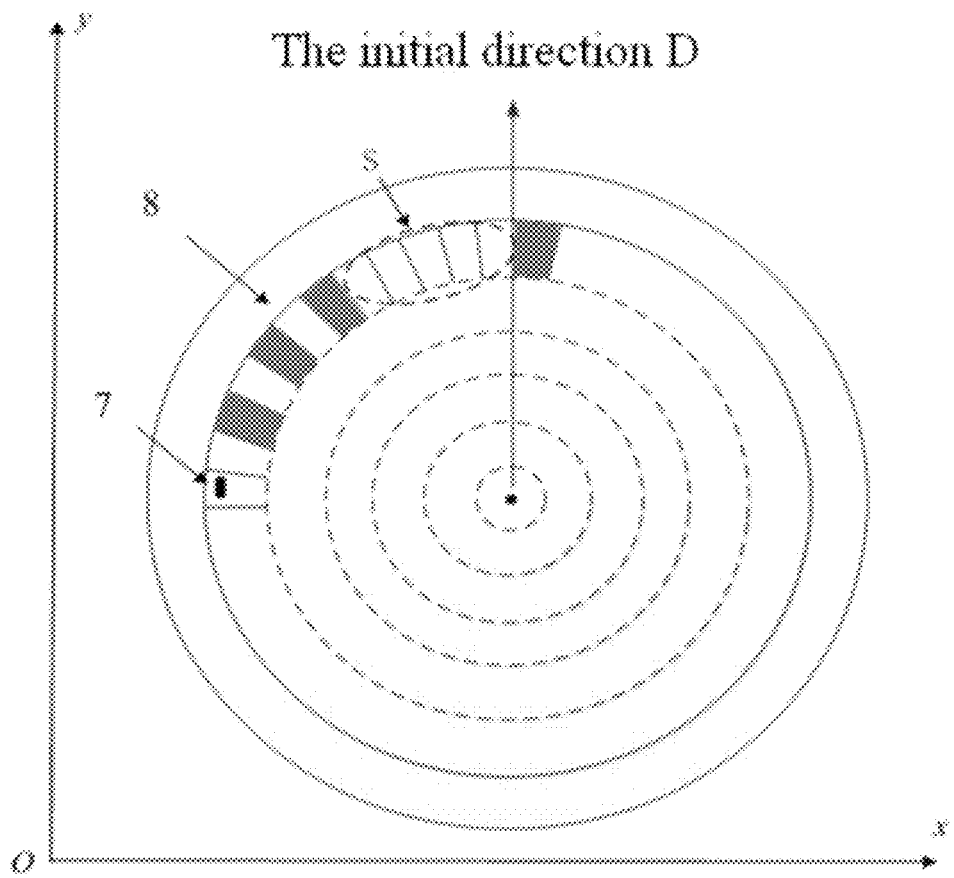
FIG. 6 illustrates a schematic diagram of a projection of the rotating outer shell of the indoor positioning device provided by the first embodiment of the present invention.

Based on the aforesaid indoor positioning device, the present invention provides an indoor positioning method, as shown in FIG. 6, the method comprises the following steps:

in step 101, driving a rotating outer shell 4 to rotate, and enabling a projected light ring 8 projected by a light source 2 onto a horizontal plane where a point to be positioned is located to rotate with the rotating outer shell 4;

in step 102, by the receiver 7 located at the point to be positioned, sensing an optical signal, according to the optical signal, determining the projected light ring 8 where the point to be positioned is located and an angle $\theta$ between a connecting line that connects the point to be positioned with the light source 2 and a rotating axis of the rotating outer shell 4;

in step 103, defining a direction directed by a projection of a distal end of an end bit on a horizontal plane when a light barrier passes through a groove as an initial direction, by the receiver 7, detecting a frequency hopping point of the light source 2 and the distal end of the end bit, determining an angle $\omega$ between the point to be positioned and the initial direction;

in step 104, according to the angle $\theta$ and the angle $\omega$, determining a position of the point to be positioned.

In this embodiment of the present invention, when each encoded ring 41 has the same angle $\alpha$ in the longitudinal direction, $\alpha=90°/M$, M is the total number of the encoded rings, and thus it is defined that $\theta=(m-\frac{1}{2})*\alpha$, m is the ring number of the projected light ring 8, that is, the number of the projected light rings located at an inner side of the projected light ring where the point to be positioned is located (including the projected light ring where the point to be positioned is located), and the ring numbers of the projected light rings are sequentially labeled as 1, 2, . . . m . . . M from inside to outside. In another embodiment, when each encoded ring 41 has a different angle in the longitudinal direction, and the angles of encoded rings 41 in the longitudinal direction are recorded as $\alpha_1$, $\alpha_2$, ... $\alpha_M$ respectively, the included angle θ is defined as: $\theta = \alpha_1 + \alpha_2 + \ldots \alpha_m/2$.

Further, in a time interval from a time when the frequency hopping point is detected to a time when the distal end of the end bit is detected, the number n of the encoding bits passed rotationally can be determined. When the frequency hopping point takes place when the light barrier 31 passes through the groove, $\omega = (n-\frac{1}{2})*\beta$; when the frequency hopping point takes place when the light barrier 31 passes through the groove and continues to rotate by one encoding bit 411, $\omega = (n+\frac{1}{2})*\beta$, wherein β represents an angle of each encoding bit 411 in a latitudinal direction; and β=360°/N, wherein N is the number of the encoding bits in each encoded ring 41, for example, if the number of the encoding bits is 48, β=7.5°; each encoded ring 41 can be divided into encoding bits 411 with other numbers, and the angle β can change accordingly.

In this embodiment of the present invention, after the aforesaid angle θ and angle co are obtained, in a preset coordinate system, in combination with the coordinate of the light source 2 and a vertical distance from the light source 2 to the horizontal plane where the point to be positioned is located, a coordinate of the point to be positioned can be determined.

Figure 7:
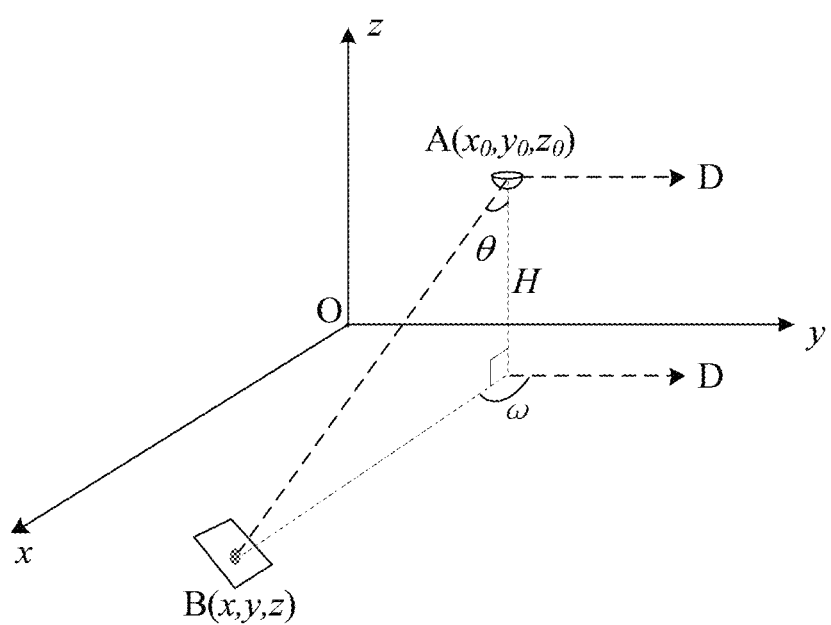
FIG. 7 illustrates a schematic diagram of using the indoor positioning device provided by the first embodiment of the present invention to position in a predetermined coordinate system.

Specifically, please refer to FIG. 7, when a vertical height H from the light source 2 to the point to be positioned is known, and the coordinate $(x_0, y_0, z_0)$ of the light source 2 is known, the coordinate of the point to be positioned is:

$(x_0 + H*\tan(\theta)*\sin(\omega), y_0 + H*\tan(\theta)*\cos(\omega), z_0 - H)$.

When the vertical height from the light source 2 to the point to be positioned is unknown, but the coordinate $(x_0, y_0, z_0)$ of the light source 2 is known, two indoor positioning devices are adopted, and irradiating surfaces of the two light sources 2 have an intersecting area, and the point to be positioned is located in the intersecting area; the coordinate of the point to be positioned is determined by the known coordinates of the two light sources 2, the included angle θ, and the included angle ω. Supposing that the position of one light source 2 is an A point, the position of the other light source 2 is a C point, and the point to be positioned is a B point, a straight line that connects the point A of the light source 2 with the locating point B of the receiver 7 can be solely determined, and the straight line passes a point P $(x_1, y_1, z_1)$ on the rotating outer shell 4, the coordinate of the point to be positioned is $(x_0 + r*\sin(\theta)*\sin(\omega), y_0 + r*\sin(\theta)*\cos(\omega), z_0 - r*\cos(\theta))$; a straight line connecting the point C with the point B can also be determined, the straight line passes a point Q $(x_3, y_3, z_3)$ on the rotating outer shell 4, wherein r is a known radius of the rotating outer shell 4.

When two points in the space is known, an equation $L_1$ of a straight line AB can be established:

$$\frac{x - x_0}{x_1 - x_0} = \frac{y - y_0}{y_1 - y_0} = \frac{z - z_0}{z_1 - z_0}$$

and an equation $L_2$ of a straight line CB can be established:

$$\frac{x - x_2}{x_3 - x_2} = \frac{y - y_2}{y_3 - y_2} = \frac{z - z_2}{z_3 - z_2}$$

by combining $L_1$ with $L_2$, and according to the least square method, the coordinate of the point to be positioned is calculated.

It is understandable that, when performing actual positioning, a coordinate system needs to be determined firstly, and then the initial direction needs to be determined, a location coordinate is also a coordinate in the coordinate system. As shown in FIGS. 4-7, generally, the base 1 of the indoor positioning device is fixed to an indoor ceiling, the base 1 can't rotate, the light source 2 irradiates downwardly and covers indoor space, the rotating outer shell 4 rotates around a rotating axis thereof, the rotating axis originates from the light source 2, passes a top point of the rotating outer shell 4, and is perpendicular to the ground. In a three-dimensional indoor space, a corner point on the indoor ground is used as the original point O (0, 0, 0) to establish a right hand rectangular coordinate system, of which an X-axis and a Y-axis are respectively coincident with two corner edges of the ground that are perpendicular to each other; a Z-axis is placed to be perpendicular to the X-axis and the Y-axis, and coincide with a corner edge directing to a roof perpendicularly, that is, an XOY plane coincides with a horizontal ground plane, and the Z-axis directs to the roof perpendicularly. The initial direction of the rotating outer shell 4 is set to be parallel to the direction of the Y-axis and direct to the positive direction of the Y-axis. That is, when the light barrier 31 passes the optical coupler 11, a direction directed by a distal end of the end bit is the positive direction of the Y-axis. The coordinate $(x_0, y_0, z_0)$ of the light source 2 is known.

Figure 8:
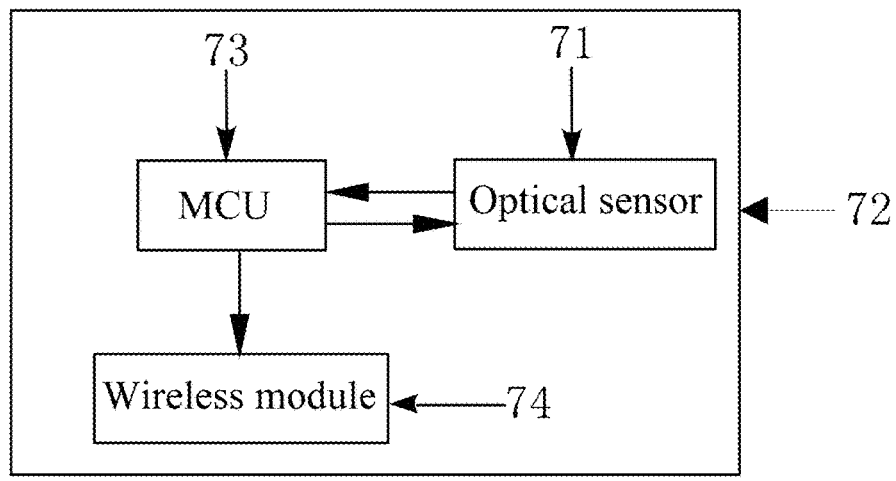
FIG. 8 illustrates a structural schematic diagram of a receiver of the indoor positioning device provided by the first embodiment of the present invention.
Figure 9:
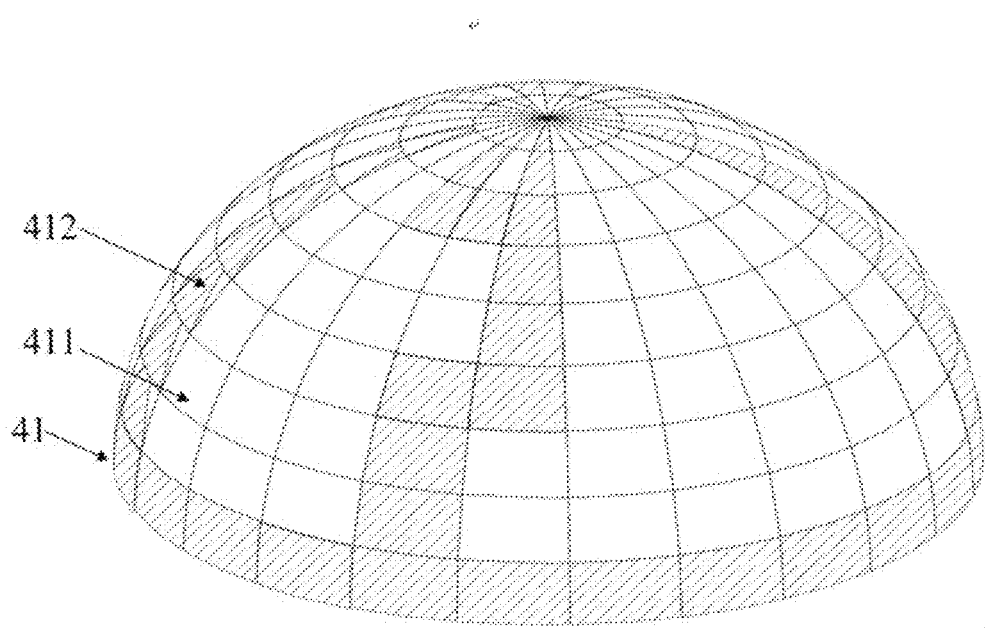
FIG. 9 illustrates a spatial structural schematic diagram of a rotating outer shell of an indoor positioning device provided by a second embodiment of the present invention.
Figure 10:
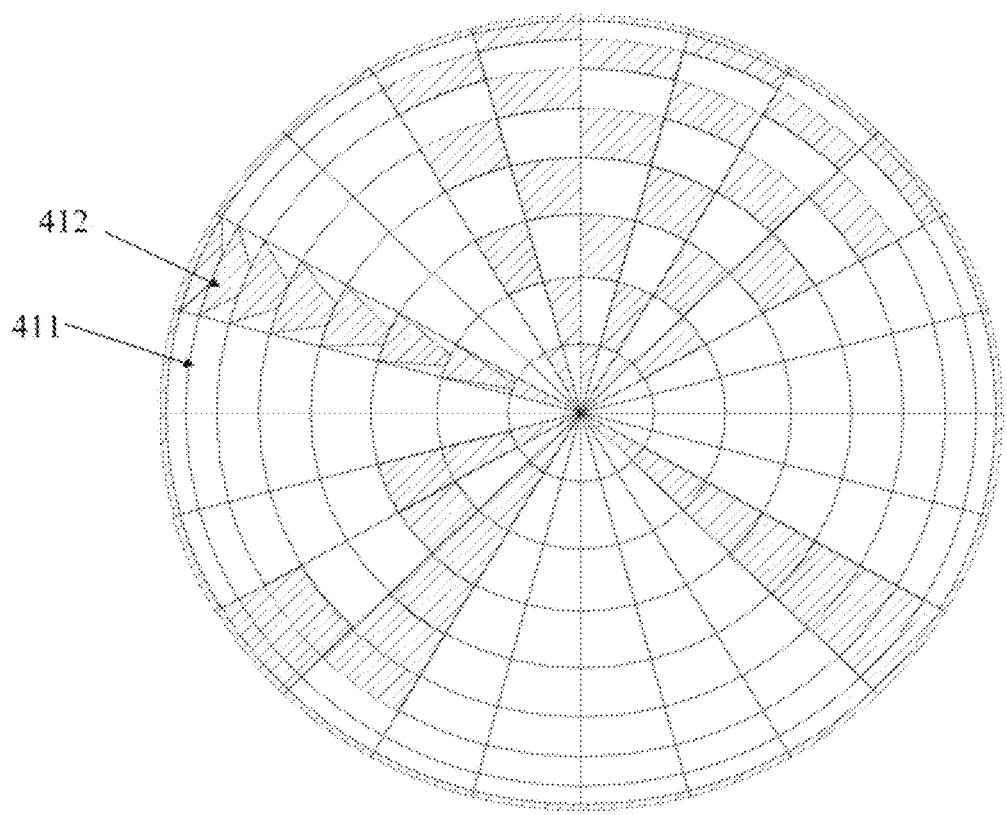
FIG. 10 illustrates a top structural schematic diagram of the rotating outer shell of the indoor positioning device provided by the second embodiment of the present invention.
Figure 11:
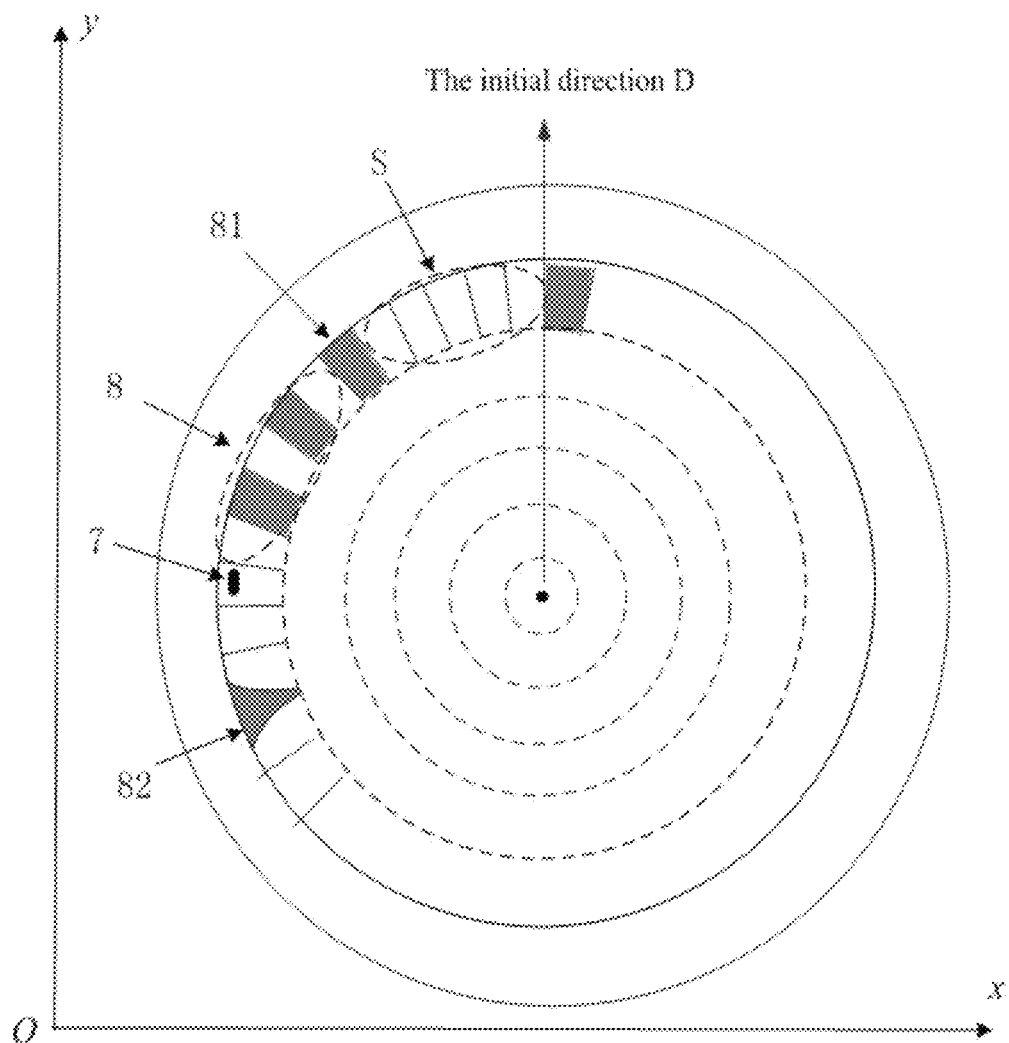
FIG. 11 illustrates a schematic diagram of a projection of the rotating outer shell of the indoor positioning device provided by the second embodiment of the present invention.

Please further refer to FIG. 8, the receiver 7 can comprises an optical sensor 71, the optical sensor 71 is mounted on a small circuit board 72, and the circuit board 72 is further provided thereon with a processor 73, a wireless transmission module 74, and so on. Otherwise, a mobile device having an optical sensor 71 can be used as the signal receiver.

In this embodiment of the present invention, since environment interfering frequencies, a plurality of frequency components generated when the rotating outer shell 4 rotates, other interfering frequencies, and the like are mixed in data received by the receiver 7, the data needs to be processed in the following way. Firstly, the data passes through a band-pass filter, and signals with frequencies lower than the lowest usable frequency of the light source 2 and signals with frequencies higher than the highest usable frequency of the light source 2 are filtered (in the present embodiment, signals with frequencies lower than 20 hz and signals with frequencies higher than 350 hz are filtered), then the filtered data is processed by a time-frequency transformation, such as, a wavelet time-frequency transformation, a Short Time Fourier Transformation (STFT), and so on (in the present embodiment, the wavelet time-frequency transformation is used), and finally, outer shell circle encoding information including a circle number code, an end bit code, and a frequency hopping point of the light source 2 is extracted from a time-frequency transformation result coefficient.

In the indoor positioning device provided by the embodiment of the present invention, by arranging the rotating outer shell 4 having a special structure, and by designing the hopping rule of a frequency of the light source, a signal receiver is used to sense the optical signal, and in combination with the aforesaid calculation method, the coordinate of the signal receiver in indoor space can be calculated; the indoor positioning device has a simplified structure and the indoor positioning method is novel, accurate, and has a good stability; there is no need to spend much manpower and material resources in collecting data such as fingerprints, and there is no need to arrange many reference points; the indoor positioning device is not prone to be affected by an external environment, has a high precision, a good stability, and low cost, and is applicable to indoor high precision positioning.

Embodiment Two

As shown in FIG. 1 and FIGS. 9-12, an indoor positioning device provided by a second embodiment of the present invention is similar to the indoor positioning device provided by the first embodiment in that: the indoor positioning device also comprises a base 1, a light source 2 mounted on the base 1, a rotating part 3, a rotating outer shell 4 arranged on the rotating outer shell 3, and further comprises a controller 5 capable of controlling the light source 2 to perform a frequency hopping. Wherein, what is different from the indoor positioning device of the first embodiment is that: the structure of the rotating outer shell 4 in the second embodiment has been further improved.

Specifically, except the structure in the aforementioned embodiment one, the rotating outer shell 4 of the present embodiment further has the following features, that is, each encoded ring 41 comprises a special encoding bit 412 having a configuration that is different from that of other encoding bits, a width of the special encoding bit 412 is in accordance with a preset changing rule in a longitudinal direction, for example, the larger the distance between the special encoding bit 412 and a top point of the rotating outer shell 4, the wider the special encoding bit 412, and thus the special encoding bit 412 is substantially trapezoid-shaped; as a result, a width at a certain position is relevant with a distance from the position to an inner edge of the encoded ring 41, according to the width data, an inner edge a of a projection 81 of the encoding bit 411 where a point to be positioned is located and a flare angle of the point to be positioned relative to a center of sphere of the rotating outer shell 4 can be determined. In the present embodiment, the special encoding bit 412 can have a configuration of which two lateral edges are neither parallel to nor coincident with any longitude line, and is substantially trapezoid-shaped; the special encoding bits 412 of different encoded rings 41 can be located at the same longitude line or at different longitude lines. Wherein, "inner edge" a represents an edge that is close to a center of the projected light ring 8, and "outer edge" b represents an edge that is away from the center of the projected light ring 8. In another aspect, each encoded ring 41 has an identical angle α relative to the light source 2.

Based on the aforesaid structure and principle, the embodiment of the present invention can also improve the indoor positioning method of the aforesaid first embodiment. Specifically, "determining an angle θ between a connecting line that connects the point to be positioned with the light source and a rotating axis of the rotating outer shell" in the step 102 of the first embodiment specifically includes following steps, as shown in FIG. 13:

S201, when each encoded ring 41 has an identical angle θ in the longitudinal direction, determining an angle $\theta^r = r \cdot \alpha$ between a connecting line that connects the inner edge of the projected light ring 8 where the point to be positioned is located with the light source 2 and the rotating axis of the rotating outer shell 4; when each encoded ring 41 has a different angle in the longitudinal direction, determining an angle $\theta^r = \alpha_1 + \alpha_2 + \ldots \alpha_r$ between the connecting line that connects the inner edge of the projected light ring 8 where the point to be positioned is located with the light source 2 and the rotating axis of the rotating outer shell 4; wherein, r is the number of the projected light rings 8 located at an inner side of the projected light ring where the point to be positioned is located, $\alpha_1, \alpha_2 \ldots \alpha_r$ are angles of a first encoded ring, a second encoded ring . . . a rth encoded ring in the longitudinal direction;

S202, according to the width of the special encoding bit 412 sensed by the receiver 7, determining an included angle $\Delta\theta^r$ of the point to be positioned and the inner edge of the projected light ring 8 where the point to be positioned is located relative to the light source 2;

S203, determining the angle $\theta = \theta^r + \Delta\theta^r$ between the connecting line that connects the point to be positioned with the light source 2 and the rotating axis.

Figure 12:
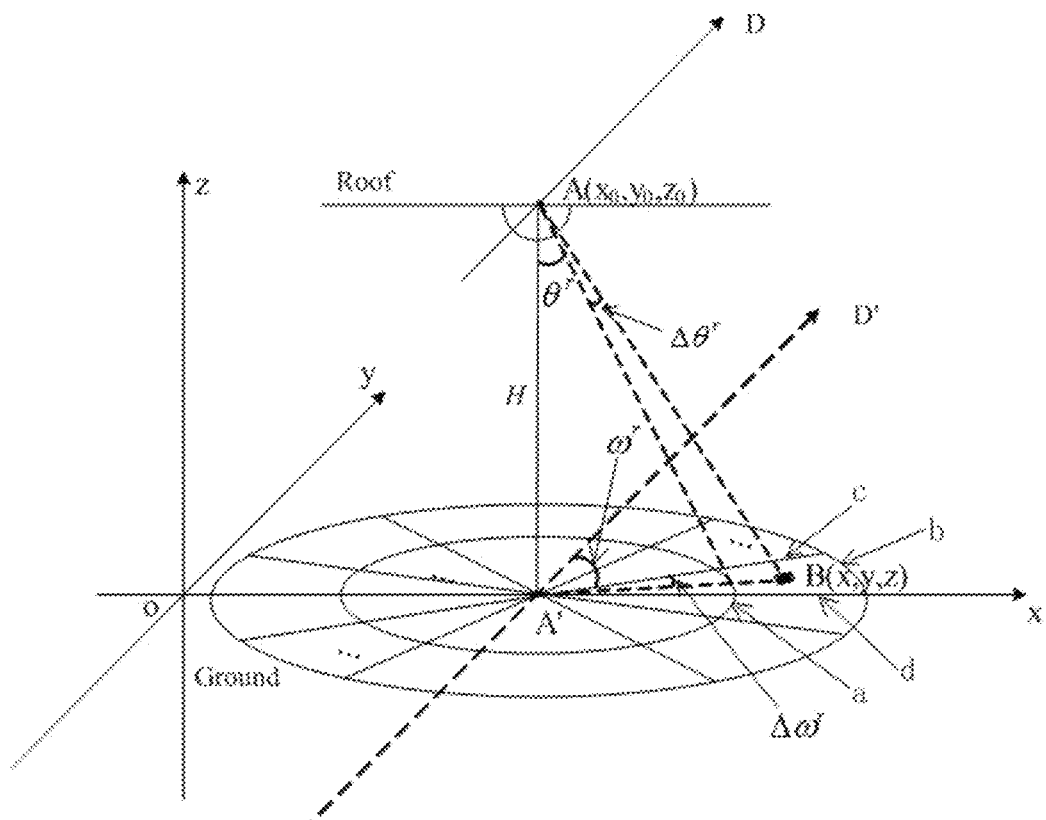
FIG. 12 illustrates a schematic diagram of using the indoor positioning device provided by the second embodiment of the present invention to position in a predetermined coordinate system.

Specifically, as shown in FIG. 12, since the arrangement of the encoding bits 411 of each encoded ring 41 has its particularity, according to the optical signal sensed by the receiver 7, the projected light ring 8 where the receiver 7 is located can be determined, how many projected light rings 8 are located at the inner side of the projection ring 8 where the receiver 7 is located can be further determined, and the angle $\theta^r = r \cdot \alpha$ between the connecting line that connects the inner edge of the projected light ring 8 where the receiver 7 is located with the light source 2 and the rotating axis of the rotating outer shell 4 can be further confirmed; wherein, r is the number of the projected light rings 8 located at the inner side of the projected light ring 8 where the point to be positioned is located. Further, using the width of the projection 82 of the special encoding bit 412 sensed by the receiver 7, an included angle $\Delta\theta^r$ between the connecting line that connects the point to be positioned with the light source 2 and the connecting line that connects the inner edge of the projected light ring 8 where the point to be positioned is located with the light source 2, that is, the angle $\Delta\theta^r$ of the inner edge a of the projected light ring 8 where the point to be positioned is located and the point to be positioned relative to the light source 2, can be determined. Understandably, both the angle $\theta^r$ and the angle $\Delta\theta^r$ are included angles in the longitudinal direction. After the two angles are obtained, the angle $\theta = \theta^r + \Delta\theta^r$ between the connecting line that connects the point to be positioned with the light source 2 and the rotating axis can be determined.

Figure 14:
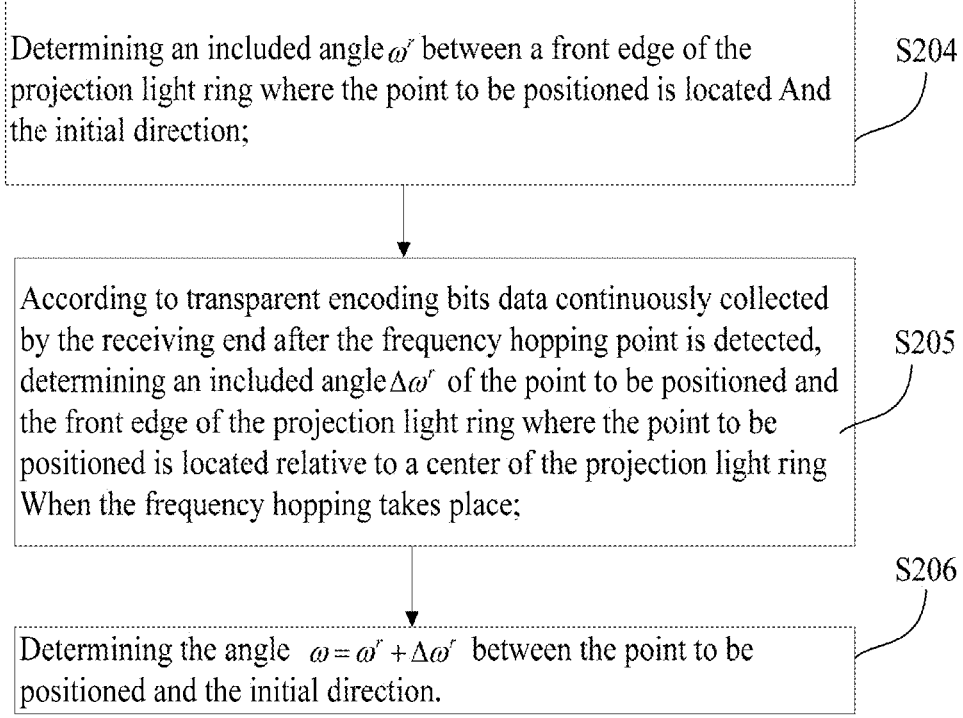
FIG. 14 illustrates a flow chart of obtaining an angle ω by the indoor positioning method provided by the second embodiment of the present invention.

Further, in the step 103 of the first embodiment, "determining an angle ω between the 1 point to be positioned and the initial direction" specifically includes following steps, as shown in FIG. 14:

S204, confirming an included angle $\omega^r$ between a front edge of the projected light ring 8 where the point to be positioned is located and the initial direction;

S205, according to transparent encoding bit data continuously collected by the receiving end 7 after the frequency hopping point is detected, determining an included angle $\Delta\omega^r$ of the point to be positioned and the front edge of the projected light ring 8 where the point to be positioned is located relative to a center of the projected light ring 8 when the frequency hopping takes place.

S206, determining the angle $\omega = \omega^r + \Delta\omega^r$ between the point to be positioned and the initial direction.

Specifically, as shown in FIG. 12, "front edge" is an edge of a projection 81 of an encoding bit being close to the initial direction, and "back edge" is an edge of the projection 81 of the encoding bit being away from the initial direction. $\omega^r$ can be determined in this way: in the time interval from a time point when the frequency hopping point is detected by the receiver 7 to a time point when a distal end of an end bit is detected by the receiver 7, the number n of the encoding bits by which the rotating outer shell 4 is rotated (including the encoding bit where the receiver 7 itself lies) can be determined, and the aforesaid included angle $\omega^r$ can be further determined. When the frequency hopping takes place when a light barrier 31 passes through a groove, that is, when it is detected that the frequency is switched from a first frequency to a second frequency, or $\omega^r=(n-1)*\beta$, wherein n is the number of the encoding bits by which the rotating outer shell 4 is rotated in the time interval from the time point when the frequency hopping point is detected by the receiver 7 to the time point when a distal end of an end bit is detected by the receiver 7, and includes the encoding bit where the point to be positioned itself lies; when the frequency hopping takes place when the light barrier 31 passes through the groove and continues to rotate by one encoding bit, that is, when it is detected that the frequency is switched from the first frequency to the second frequency, $\omega^r=n*\beta$.

$\Delta\omega^r$ is determined in this way: according to transparent encoding bits information continuously collected by the receiver 7 after detecting the frequency hopping point, a width between the point to be positioned and a projection of a opaque encoding bit being closest to the point to be positioned can be obtained; and according to pre-known width of each encoding bit 411, the number of spaced encoding bit projections between the point to be positioned and the projection of the opaque encoding bit being closest to the point to be positioned, a width la between the point to be positioned and the front edge c of the encoding bit projection where the point to be positioned lies, and a width lb between the point to be positioned and the back edge d of the encoding bit projection where the point to be positioned lies can be determined, $\Delta\omega^r=la/(la+lb)*\beta$. It is understandable that, the aforesaid "width" should not be limited by a dimension concept, and can be the number of data collected by the receiver 7. With regard to each of the predetermined encoding bits 411, the number of data collected by the receiver 7 is certain, therefore, the aforesaid $\Delta\omega^r$ can be determined according to collected data size.

After the aforesaid angle $\theta$ and angle $\omega$ are obtained, in the preset coordinate system, in combination with the coordination of the light source 2 and the perpendicular distance from the light source 2 to the horizontal plane where the point to be positioned is located, the coordinate of the point to be positioned can be determined in combination with the calculation method described in the embodiment one.

In the indoor positioning device provided by the embodiment of the present invention, by arranging the rotating outer shell 4 having special encoding bits, in combination with the arrangements of the special encoding bits, and by designing the hopping rule of the frequency of the light source, using a signal receiver to sense optical signal, the coordinate of the signal receiver in indoor space can be calculated more accurately; the indoor positioning device has a simplified structure and the method for indoor positioning is novel, accurate, and has a good stability; there is no need to spend much manpower and material resources in collecting data such as fingerprints, and there is no need to arrange many reference points; the indoor positioning device is not prone to be affected by an external environment, has a high precision, a good stability, and low cost, and is applicable to indoor high precision positioning.

What stated above are merely preferable embodiments of the present invention, and should not be regarded as being limitation to the present invention, any modification, equivalent replacement and improvement made within the spirit and the principle of the present invention should be included in the protection scope of the present invention.

The invention claimed is:

1. An indoor positioning device, comprising a base, a light source mounted on the base, a rotating part, a rotating outer shell arranged on the rotating part, and a controller;
   the rotating outer shell is a hemispherical shell body or a shell body formed by splicing a plurality of small flat surfaces or annular surfaces together and being tangent externally with a hemispherical surface; a luminous point of the light source is positioned at a spherical center of the hemispherical surface;
   the rotating outer shell is divided into a plurality of encoded rings that are parallel to latitude lines, in a longitudinal direction, an angle $\alpha$ of each encoded ring relative to the light source is known; each encoded ring relative to the light source is divided into a plurality of encoding bits, in a latitudinal direction, an angle $\beta$ of each of the encoding bits relative to a center point of the encoded ring is 360/N degree, wherein N is the number of the encoding bits in one encoded ring, and is a positive integer equal to or greater than 3, and N satisfies that different encoded rings have different arrangements of encoding bits respectively;
   in each encoded ring, some encoding bits are in a transparent state, and there is no arrangement of two or more continuous opaque encoding bits, some encoding bits arranged in a specified style constitutes a start bit or an end bit of the encoded ring;
   the base is further provided with an opto-isolator having a groove, a side of the rotating part facing the base is provided with a light barrier, once the rotating part drives the light barrier to pass through the groove, the controller controls the light source to generate a frequency hopping;
   the indoor positioning device further comprises a receiver configured to be placed at a point to be positioned to sense optical signal, detecting a frequency hopping point, and performing positioning according to the optical signal and the frequency hopping point.

2. The indoor positioning device according to claim 1, wherein each encoded ring comprises a special encoding bit having a shape that is different from that of other encoding bits, a width of the special encoding bit is in accordance with a predetermined changing rule in a longitudinal direction.

3. The indoor positioning device according to claim 2, wherein two lateral edges of the special encoding bit are neither parallel to nor coincident with longitude lines, and the special encoding bit is substantially trapezoid-shaped.

4. The indoor positioning device according to claim 1, wherein the start bit or the end bit includes a plurality of encoding bits arranged continuously and in a transparent state.

5. The indoor positioning device according to claim 1, wherein a working frequency of the light source includes a first frequency and a second frequency;
   when the light barrier passes through the groove, if the working frequency of the light source is the first frequency, the controller controls the light source to hop into the second frequency; if the working frequency of the light source is the second frequency, the controller controls the light source to hop into the first frequency after the rotating outer shell continues to rotate by one encoding bit.

6. The indoor positioning device according to claim 1, wherein each encoded ring has an identical or different angle in the longitudinal direction.

7. An indoor positioning method based on the indoor positioning device according to claim 1, comprising:

driving the rotating outer shell to rotate, and enabling a projection light ring of the rotating outer shell projected by the light source onto a horizontal plane where the point to be positioned is located to rotate with the rotating outer shell;

sensing the optical signal by the receiver located at the point to be positioned, determining the projection light ring where the receiver is located according to the optical signal, and determining an angle $\theta$ between a connecting line that connects the point to be positioned with the light source and a rotating axis of the rotating outer shell;

defining a direction directed by a projection of a distal end of the start bit or the end bit on the horizontal plane when the light barrier passes through the groove as an initial direction, detecting the frequency hopping point of the light source and the distal end of the start bit or the end bit, and determining an angle $\omega$ between the point to be positioned and the initial direction by the receiver;

determining the position of the point to be positioned according to the angle $\theta$ and the angle $\omega$.

8. The indoor positioning method according to claim 7, wherein the step of determining an angle $\theta$ between a connecting line that connects the point to be positioned with the light source and a rotating axis of the rotating outer shell specifically includes:

when each encoded ring has an identical angle $\alpha$ in a longitudinal direction, $\theta=(m-\frac{1}{2})*\alpha$;

when each encoded ring has a different angle in the longitudinal direction, $\theta=\alpha_1+\alpha_2+\ldots\alpha_m/2$;

wherein, m is the number of the projection light rings at the inner side of the point to be positioned, and includes the projection light ring where the point to be positioned is located, $\alpha_1, \alpha_2, \ldots \alpha_m$ are angles of a first encoded ring, a second encoded ring, . . . a mth encoded ring in the longitudinal direction respectively.

9. The indoor positioning method according to claim 7, wherein under the following circumstance: each encoded ring of the rotating outer shell comprises a special encoding bit that is different from other encoding bits in shape, and a width of the special encoding bit is in accordance with a predetermined changing rule in the longitudinal direction, the step of determining an angle $\theta$ between a connecting line that connects the point to be positioned with the light source and a rotating axis of the rotating outer shell specifically includes:

when each encoded ring has an identical angle $\alpha$ in the longitudinal direction, determining an angle $\theta^r=r*\alpha$ between a connecting line that connects an inner edge of the projection light ring where the point to be positioned is located with the light source and the rotating axis of the rotating outer shell; when each encoded ring has a different angle in the longitudinal direction, determining an angle $\theta^r=\alpha_1=\alpha_2=\ldots \alpha_r$, between a connecting line that connects an inner edge of the projection light ring where the point to be positioned is located with the light source and the rotating axis of the rotating outer shell; wherein, r is the number of the projection light rings at the inner side of the projection light ring where the point to be positioned is located, $\alpha_1, \alpha_2, \ldots \alpha_m$ are angles of the first encoded ring, the second encoded ring, . . . the mth encoded ring in the longitudinal direction respectively;

according to the width of the special encoding bit sensed by the receiver, determining an included angle $\Delta\theta^r$ of the point to be positioned and the inner edge of the projection light ring where the point to be positioned is located relative to the light source;

determining the angle $\theta=\theta^r+\Delta\theta^r$ between the connecting line that connects the point to be positioned with the light source and the rotating axis.

10. The indoor positioning method according to claim 7, wherein determining an angle $\omega$ between the point to be positioned and the initial direction specifically includes following steps:

determining an included angle $\omega^r$ between a front edge of the projection light ring wherein the point to be positioned is located and the initial direction, r is the number of the projection light rings at the inner side of the projection light ring where the point to be positioned is located;

according to transparent encoding bit data collected continuously by the receiver after the frequency hopping point is detected, determining an included angle $\Delta\omega^r$ of the point to be positioned and the front edge of the projection light ring where the point to be positioned is located relative to a center of the projection light ring when the frequency hopping takes place;

determining the angle $\omega=\omega^r+\Delta\alpha^r$ between the point to be positioned and the initial direction.

11. The indoor positioning method according to claim 10, wherein when the frequency hopping takes place at a time when the light barrier passes through the groove, $\omega^r=(n-1)*\beta$, n is the number of the encoding bits by which the rotating outer shell is rotated in a time interval from a time when the frequency hopping point is detected by the receiver to a time when a distal end of the end bit is detected by the receiver, and includes the encoding bit corresponding to the projection light ring where the point to be positioned is located; when the frequency hopping takes place at a time when the light barrier passes through the groove and continues to rotate by one encoding bit, $\omega^r=n*\beta$.

12. The indoor positioning method according to claim 7, wherein, when a vertical height H from the light source to the point to be positioned is known, and a coordinate $(x_0, y_0, z_0)$ of the light source is known too, a coordinate of the point to be positioned is:

$(x_0+H*\tan(\theta)*\sin(\omega), y_0+H*\tan(\theta)*\cos(\omega), z_0-H)$.

13. The indoor positioning method according to claim 7, wherein when the vertical height H from the light source to the point to be positioned is unknown, but a coordinate $(x_0, y_0, z_0)$ of the light source is known, two indoor positioning devices are applied, and irradiating surfaces of the two light sources have an intersecting area, the point to be positioned is located in the intersecting area, and a coordinate of the point to be positioned is determined according to coordinates of the two known light sources, the included angle $\theta$, and the included angle $\omega$.

14. The indoor positioning method according to claim 7, wherein the light source is set to work under a first frequency and a second frequency, when the light barrier passes through the groove , if the frequency of the light source is the first frequency, the light source is controlled to hop into the second frequency; if the frequency of the light source is the second frequency, the light source is controlled to hop into the first frequency after the rotating outer shell continues to rotate by one encoding bit.

15. The indoor positioning device according to claim 1, wherein N is equal to or greater than 48.

* * * * *